(12) United States Patent
Roysden, Jr.

(10) Patent No.: US 6,939,065 B2
(45) Date of Patent: Sep. 6, 2005

(54) KEYBOARD WITH INTERLEAVED COMPUTER COMPONENTS

(76) Inventor: Brunn Wall Roysden, Jr., 4102 E. Palo Verde, Phoenix, AZ (US) 85018

( * ) Notice: Subject to any disclaimer, the term of this patent is extended or adjusted under 35 U.S.C. 154(b) by 0 days.

(21) Appl. No.: 09/442,187

(22) Filed: Nov. 16, 1999

(65) Prior Publication Data

US 2002/0018683 A1 Feb. 14, 2002

Related U.S. Application Data

(60) Provisional application No. 60/108,846, filed on Nov. 18, 1998.

(51) Int. Cl.[7] ............................................. G06F 3/023
(52) U.S. Cl. .......................... 400/472; 341/22; 345/168
(58) Field of Search ....................... 345/168; 400/472, 400/488, 492, 490, 495, 496; 341/21, 22, 168; 361/679, 680

(56) References Cited

U.S. PATENT DOCUMENTS

| | | | |
|---|---|---|---|
| 3,940,758 A | | 2/1976 | Margolin |
| 4,395,704 A | | 7/1983 | Kishimoto et al. |
| 4,661,005 A | * | 4/1987 | Lahr ............................ 400/489 |
| 5,044,798 A | | 9/1991 | Roylance et al. |
| 5,212,473 A | | 5/1993 | Louis |
| 5,523,755 A | | 6/1996 | Wooten |
| 5,532,904 A | | 7/1996 | Sellers |
| 5,575,576 A | * | 11/1996 | Roysden, Jr. ............... 400/472 |
| 5,590,020 A | | 12/1996 | Sellers |
| 5,708,428 A | * | 1/1998 | Phillips ........................ 341/22 |
| 5,880,685 A | * | 3/1999 | Weeks .......................... 341/22 |
| 5,941,648 A | * | 8/1999 | Robinson et al. ............ 400/472 |
| 5,943,041 A | * | 8/1999 | Allison et al. ............... 400/472 |
| 5,971,637 A | | 10/1999 | Malhi et al. |
| 6,026,283 A | * | 2/2000 | Stephenson ................... 455/90 |
| 6,172,620 B1 | * | 1/2001 | Brick et al. ................... 341/22 |
| 6,249,586 B1 | * | 6/2001 | Stoffel et al. ................ 381/174 |
| 6,256,017 B1 | * | 7/2001 | Bullister ....................... 345/168 |
| 6,262,883 B1 | * | 7/2001 | Kim ............................ 361/680 |
| 6,288,895 B1 | * | 9/2001 | Bhatia ......................... 361/687 |
| 6,400,351 B1 | * | 6/2002 | Ishizawa et al. ............. 345/156 |
| 2002/0039165 A1 | * | 4/2002 | Hirakata ..................... 349/149 |

OTHER PUBLICATIONS

Webster's Third New International Dictionary, Unabridged; 1962; G. & C. Merriam Company; p. 26.*
Advertisement for Think Outside's foldable keyboard, the Stowaway published in www.smalloffice.com, Dec. 1999, p. 26 and 27.
Advertisement for Cybernet Manufacturing, Inc.'s Zero Footprint-PC published in ZD Marketplace at p. 191.
O'Regan, Rob, "Handhelds Finally Catching Up to the Hype," www.eweek.com, Jul. 3, 2000, p. 3.

* cited by examiner

Primary Examiner—Daniel J. Colilla
(74) Attorney, Agent, or Firm—Richard E. Oney (57) ABSTRACT

A computer, including a keyboard for the input of data and commands, in which components of the Computer other than the components of the keyboard are interleaved between the keys of the keyboard, making it possible to build a computer smaller in volume than a computer of comparable capabilities without the interleaving of Computer Components.

47 Claims, 7 Drawing Sheets

KEYBOARD WITH INTERLEAVED COMPUTER COMPONENTS

This application claims the benefit of Provisional Application No. 60/108,846, filed Nov. 18, 1998.

TECHNICAL FIELD

My invention relates to keyboards, and particularly, to keyboards for typewriters, computers, calculators, telephones, and other types of equipment defined as "computers", below, which utilize a keyboard for the input of data or commands. The purpose of this Disclosure is to explain how to build a computer using the space between the keys of a keyboard to contain some components of the computer that would normally be placed outside the space occupied by the keys of said keyboard (herein "Computer Components" other than "Keyboard Components"), thereby reducing the overall size of the computer.

BACKGROUND ART

A computer is a device which includes
a central processing unit (CPU), consisting of control and arithmetic/logic sections that processes information (data); a main memory unit . . . in which the information is held while being processed; and devices that respectively feed information into the CPU (input) and provide the user with the results of the computation (output).

*The Tormont Webster's Illustrated Encyclopedic Dictionary,* 1990 edition published by Tormont Publications Inc., 338 St. Antoine St. East, Montreal, Canada H2Y 1A3, page 363.

A device need not be popularly known as a "computer" to come within the definition outlined above. Thus, a "personal organizer" and a Personal Digital Assistant (PDA) are examples of two other forms which would be included within the definition of a computer.

In addition to the components mentioned in the *Tormont* definition, a computer may contain or be associated with other components. For example, a cellular phone, which would have many components not covered by the definition above, could still include those features which would make such a device a "computer". I will discuss some of those components, and in doing so define the term "Computer Components". To assure there is no misunderstanding, the *Tormont* definition supplies the minimum required to define a "computer". However, a computer may in fact have many additional components than those mentioned in the *Tormont* definition, and certain of those components, explained below, will be included in the term "Computer Components".

For example, a computer would require a power source. Several examples of power sources include batteries and similar electrochemical devices, storage capacitors, and fuel cells. There are a variety of power sources familiar to those skilled in the art, and it is an object of this invention to include all power sources, both those currently known and those which are developed in the future. In addition, the voltage from said power sources may vary for a variety of reasons, including but not limited to the load imposed on said power source and the state of charge of said power source. A means of regulating the available supplied voltage is called here Power Regulation Means. To avoid repetition and to aid in a ready understanding of the principals involved, I mean the term "Power Means" to include any power source and any Power Regulation Means which provides power to the Computer Components, even if said Power Means also supplies power to components not included within the term "Computer Components".

The *Tormont* definition of computer includes a "central processing unit (CPU), consisting of control and arithmetic/logic sections that process information (data)". This CPU normally consists of one or more "Microchips". Indeed, it is possible to have more than one CPU within a computer, and it is the intention of this Patent Application that the term "computer" includes computers which includes one or more CPUs.

A computer may include one or more integrated circuits, such microprocessors, which are general purpose devices, and application specific integrated circuits (ASIC). For purposes of this Application, I will call such integrated circuits a "Microchip", and the term "Microchip" would include the CPU or CPUs, any "glue chips", memory chips, and the like. Glue chips are Microchips which provide support for input and output means.

In addition to the Microchips, the computer may contain certain passive components, such as capacitors, resistors, diodes, and the like, which are necessary for the proper functioning of the circuits associated with said Microchip (herein "Passive Components"). Said Passive Components may be either individual units ("discrete components") or packaged together into multiple units.

Most computers today transmit signals using electrical circuits. However, the term "computer" is not limited to devices which transmit signals using electrical circuits. Signals can be transmitted through other means, including electromagnetic radiation means (e.g. light and radio waves) and sound waves, and it is the intention of this Patent Application to include computers which transmit signals using other means as well as electrical circuits.

In addition, a Computer may include Output Means. Output Means would include Operator Sense means, such as visual displays and speakers and their associated circuits, and Remote Access Means. Remote Access Means includes means whereby data may be transmitted to or received from devices which are not physically attached to the Computer. Examples of Remote Access Means include modems, cellular phones, sound cards, radio waves (e.g. "Blue Tooth"), light waves (e.g. iRDA), ports, including as printer ports, serial ports and networking ports, and other similar Remote Access Means, as will be known to those familiar with the arts. It is an object of this Invention to include Output Means which are currently known and those which are developed in the future.

In addition, a Computer may contain Storage Means, which are means, both volatile and non-volatile, to store data. As used in this application, the term "data" includes information and computer programs or instructions. There are a variety of Storage Means, which are known to those familiar with these arts, and it is an intention of this Patent to include those Storage Means currently known and those which may be developed in the future.

For purposes of this Application, the term "Computer Components" includes Microchips, Passive Components, Storage Means, Output Means, and Power Means.

A computer may contain a keyboard, either integral with other portions of said computer, or as a separate unit. The keyboard is primarily an input means, although many keyboards also contain output means. It would be perfectly possible to make a computer without a keyboard, utilizing, e.g. pens, stylus, or voice commands to input information and instructions to the processor. However, the invention described here relates only to computers which include a keyboard.

A keyboard may include a plurality of keys, a keyboard structure which holds the keys in place relative to one another and may provide some support against flexure of the keyboard, switch means which detect when a key is being pressed or activated (herein "Key Switch"), and means of communicating this detection, either directly or indirectly, to the computer. For certain keyboards or keyboard sections, there may be a keyboard housing which encloses the back, sides, bottom, and a portion of the top of the keyboard; the keyboard housing may contain positioning means to place the keyboard at a comfortable angle to the user. A keyboard may lack some of the components set out above, and may contain other components.

There exists means of detecting which Key Switch has been activated, and when said activation has been discontinued. Normally, this consists of an electrical circuit that connects the Key Switch to a Keyboard Processor, defined below, although there is no requirement that this circuit be electrical in nature. For purposes of this Application, the "Keyboard Circuit" consists of means of conveying to the Keyboard Processor the information that a keyboard switch has been activated or deactivated.

There are a variety of detection means available, as is well known to those familiar with the art. It is an object of this invention to describe a keyboard which will work with a wide variety of key activation and detection means, both those now known, and those which may be developed in the future. Examples of key activation and detection means using electronic circuits are described by Wooten, U.S. Pat. No. 5,523,755 (1996), which describes both traditional and n-key rollover methods; see also Louis, U.S. Pat. No. 5,212,473 (1993), Kishimoto, U.S. Pat. No. 4,395,704 (1983); Margolin, U.S. Pat. No. 3,940,758 (1976), which claims an "electronic circuit" for the keyboard, but does not illustrate said circuit, presumably because such circuits are well known even in 1976. See also my own (Roysden) U.S. Pat. No. 5,575,576 (1997).

The device which detects which Key Switch has been activated is called the "Keyboard Processor". A Keyboard Processor is typically a microprocessor, although Wooten describes how an ASIC (Application Specific Integrated Circuit) can be used as a Keyboard Processor.

A Keyboard Processor may perform additional functions than those described above. For example, the keyboard may contain devices which permit the operator of the computer to move the position of the cursor. The cursor indicates the location on which the keyboard is to place the next letter. One class of such devices are cursor keys. In addition, there exist other devices besides keys which permit the operator of the computer through physical movement or pressure to control the movement of the cursor. Examples include a "mouse", "touch-pad" and "joy-stick" devices. Other examples are known to those familiar with these arts, and need not be explained further here. As used in this Application, any device which permits the operator of the computer through physical movement or pressure to control the movement of the cursor is called a "Cursor Movement Means".

In addition to providing input to the computer, the keyboard has means of providing sensory output to the user. Two examples of keyboard input to the user are a buzzer or speaker to provide warnings for certain situations (e.g. that the keyboard buffer is full, and will not accept further input from the keyboard), and lights, typically light-emitting diodes (LEDs), indicating that the "Number Lock" key, the "Caps Lock" key, or the "Scroll Lock" key is activated. This is well known to those skilled in the arts, and need not be discussed further here. Any signaling device contained located on the keyboard indicating state, status, or functioning of said keyboard or the effect of said keyboard on the display means is a "Keyboard Output Sensory Means".

Accordingly, for purposes of this Patent Application, a Keyboard Processor is any device which performs any of the following functions (herein "Keyboard Processor Functions"):

(a) detects the activation or inactivation of a Key Switch;

(b) detects or controls a Cursor Movement Means;

(c) controls or processes Keyboard Sensory Output Means;

(d) provides power management functions, to reduce the consumption of power when the keyboard is not being used.

For some keyboards, there will not be a Separate Keyboard Processor; the Keyboard Processor Functions will be fulfilled by circuits within the Computer itself. Accordingly, for purposes of this Patent Application, a Separate Keyboard Processor is a separate device which substantially performs no other functions than Keyboard Processor Functions.

For purposes of this Application, Keyboard Components include the following:

(a) keys of a keyboard;

(b) support structure for the keys and the keyboard;

(c) switch means associated with any key of a keyboard;

(d) Keyboard Circuits;

(e) Keyboard Sensory Output Means;

(f) Any Cursor Movement Means;

(g) Any Separate Keyboard Processor (h) Any Passive Component operationally associated with any Keyboard Component and directly connected to said Keyboard Component.

There are innumerable methods of making keys, keyboard structures, switch means, Keyboard Circuits, keyboard housings, and keyboard positioning means, as those familiar with the art will understand, and the illustrations described herein should not be deemed to be a limitation on how the principal disclosed here can be applied. A purpose of this invention is to describe a method of Interleaving Computer Components within a keyboard that can be applied to a wide variety of keyboard types, using a variety of keys, key caps, key operating means, keyboard structures, switch means, Keyboard Circuits, keyboard housings, and keyboard positioning means, both those currently known and those that may be developed in the future. For purposes of illustration, I will describe a typical keyboard key using membrane switch technology, then modify the key to facilitate the invention described herein.

By "Interleaving Computer Components", I mean that components of the computer which are not normally a part of the keyboard (Computer Components other than Keyboard Components) that can be placed between the keys of a normal keyboard. For example, there now exists a folding keyboard which attaches to a Palm Pilot, the "Think Outside Stowaway Portable Keyboard", reported in Popular Science, November 1999 (page 91). Said keyboard collapses to about the same size as the Palm Pilot. In other words, a Palm Pilot with said keyboard possesses a volume of approximately twice that of a Palm Pilot alone. However, if the components of the Palm Pilot were interleaved within a keyboard of similar configuration, it would be possible to build a computer with a keyboard, with the exception of the screen or display, which is approximately the same volume as the Palm Pilot alone. Indeed, it would be possible to construct a computer having greater computing power and battery power than the Palm Pilot (again, without the screen) by placing some or all of the components of a Palm Pilot within the spaces between the keys of a collapsible keyboard.

In addition to saving space, Interleaving Computer Components within a keyboard aids the dissipation of heat caused by said Computer Components.

Accordingly, while placing Keyboard Components within a keyboard is not novel, placing Computer Components other than Keyboard Components within a keyboard is both novel and very useful.

Similarly, there exist keyboards in which the computer is incorporated within the keyboard structure. However, that is accomplished by placing the components below the keys of the keyboard, or outside the perimeter of the keys. There exists, to the knowledge of the undersigned, no computer keyboard in which the Computer Components other than the Keyboard Components are placed between the keys. The arrangement described in this Patent Application is both novel and meets the needs of the marketplace by describing a method of making a computer that is substantially smaller than is possible using existing technology.

In conclusion, those familiar with the technology will understand what is meant by "computer" in this Application, notwithstanding that the popular nomenclature of a device may be phone, calculator, (electronic) typewriter, PDA, or something else. It is an object of this disclosure to describe a keyboard in which a variety of Computer Components, both those which are currently known and those which are developed in the future, can be interleaved between the keys of said keyboard.

Disclosure of Invention

By interleaving within the keyboard, in whole or in part, a battery and/or other components of a computer not normally part of the keyboard, we can utilize space not normally utilized in a keyboard, and thereby make a computer with keyboard which is smaller in volume than a conventional computer with keyboard.

This Patent will apply to both to a non-compacting keyboard and a keyboard which will compact for storage. There are a variety of means of compacting a keyboard for storage (e.g. making the keyboard in sections and then folding the keyboard (e.g. Margolin, 3,940,758 (1976), or interleaving the keys (e.g. Roysden, U.S. Pat. No. 5,575,576), ("compacting keyboard"), or depressing the keys (e.g. Sellers, U.S. Pat. No. 5,971,637 (1996), Malhi, 5,971,637), or by making the keys moveable (e.g. Roylance, U.S. Pat. No. 5,044,798 (1991). In referencing said Patents, we imply no opinion on the validity of said Patents.

It is a principal object of the invention to provide a computer with a keyboard which is smaller in volume than a conventional computer of similar capabilities.

BEST MODE FOR CARRYING OUT THE INVENTION

Figure 1:
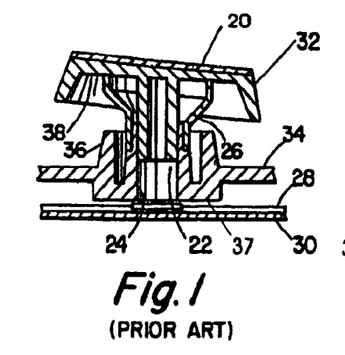
FIG. 1 shows the cross-section of a typical key on a membrane switch keyboard.

FIG. 1 shows the cross-section of a representative key and certain associated parts of a keyboard. The "Key Top", 20, is the portion of the key cap pressed by the finger of the typist to activate the key. Surrounding the key cap and serving to fill up the space between the key caps is a key cap skirt, 32. The key cap is operationally associated with a key structure which supports the key cap and causes the key cap to move in some prescribed manner when pressed. The key structure illustrated here consists of a stem or annulus, 22, which moves inside a second annulus, called here a stem receiver, 24, when the key cap is pressed. Surrounding the stem receiver is a stem receiver reinforcement member, 36.

The "bottom" of the key cap is the surface of the key cap that lies under the Key Top, and is illustrated here as 38. For purposes of orientation, the Key Top will be deemed to be the "top" part of the key and keyboard.

The "bottom" or "lowest" portion of the undepressed key illustrated would be the bottom of the stem receiver (herein "Bottom of Undepressed Key"), 37. Note that the stem would extend slightly below the Bottom of Undepressed Key when said key is fully depressed. The "Bottom of Key" is the lowest portion of a key when said key is pressed. In the illustrated key, the stem, when depressed, would travel below the stem receiver, and accordingly the stem when depressed is the Bottom of Key of said key.

When the key cap is released, the key cap and stem are returned to their initial position through the action of a "key-return mechanism". The key return mechanism illustrated here consists of an annular elastomer of special shape, 26.

Not shown is a means of keeping the stem from slipping out of the top of the stem receiver. In the illustrated key, this consists of two prongs, one on each side of stem (oriented 90° from the cross-section of FIG. 1), which prongs catch on a portion of the stem receiver reinforcement member.

The term "key" includes those components necessary or helpful to transmit the force or movement of the typist's fingers on an individual key top in a way that would be detected by the switch means associated with the key. For the illustrated key, this would include, where present, the key cap, skirt, stem, stem receiver, key retention mechanism, and key structure. For other types of keys, other components would be included within the term "key". Where components not part of the key are attached to components of the key, the components of a key are determined as if such non-key components have been severed. Where a component of a key also serves a function for a part of the keyboard other than the key, then those portions of said component that are necessary for the proper functioning of the key are deemed to be a component of the key.

In the key illustrated, the key cap and the key stem are fabricated into one piece. The term "Key Cap", as used here, will designate only those portions of the Key Cap necessary to accept the push of a finger. While the skirt, prongs, stem, stem to key cap connection means, and other such components (herein "ancillary key components"), if any such ancillary key components are present, may reinforce the Key Cap in accepting the push of a finger, such ancillary key components are not deemed to be a part of the Key Cap.

The computer must detect when a key is pressed or activated and, additionally, when a key has been released. This function is performed in this embodiment by a switch means and the associated Keyboard Circuitry, 28. The switch means illustrated here is a membrane switch which is activated when the stem, 22, presses the membrane switch against the backing plate, 30. The backing plate illustrated here is part of the keyboard structure.

A keyboard membrane switch means would contain a plurality of membrane switches; usually at least one membrane switch is associated with each key. The membrane switch means may also contain Keyboard Circuits which alerts the computer that the key cap has been pressed or released. The Keyboard Circuit may also contain diodes to prevent electrical current from flowing in undesired directions when two or more keys are pressed simultaneously. Such diodes are considered part of the Keyboard Circuit. Numerous types of switch means and Keyboard Circuits are known to those skilled in the art; accordingly, an extended discussion is not required here. It is an object of this invention to describe a method of Interleaving Computer Components other than Keyboard Components between the keys of a keyboard that will work with a wide variety of Keyboard Circuits, both those currently known and those which are developed in the future.

It is possible, and frequently desirable, to incorporate two or more of the components of a keyboard into one unit. For instance, the stem receiver described here functions both as part of the key structure and the keyboard structure, since multiple stem receivers and associated stiffening members can be molded into one monolithic (e.g. plastic) part. The stem receivers illustrated here are connected by a thin plate, called by Mitsumi a "frame", 34, said frame being part of the keyboard structure. In other types of keyboards covered by this disclosure, the key cap, stem, key return mechanism, and switch means are assembled into one package, the outside of the package being a part of the key structure; the individual keys are then assembled into one computer keyboard. In such an instance, all parts contained within said package would be deemed to be a part of the key. Other means of making or assembling a key exist, and others may be developed in the future. It is an object of this invention to describe a method of Interleaving Computer Components other than Keyboard Components between the keys of a keyboard that will work with a wide variety of keys and key assembly techniques, both those currently known and those which may be developed in the future.

In designing a computer, especially a portable computer, there are certain constraints: two of which are the size of the components and heat dissipation. Thus, a computer Microchip can be made extremely small, but it may not be possible to co-locate several Microchips in a very small space, or else the heat generated during operation will substantially shorten the life of the Microchips. Accordingly, the heat-generating Microchips must be either spread out or must be supplied with a means of supplemental cooling or both.

Heat dissipation is usually not a problem with a portable computer's batteries. However, size (volume) of the batteries is a major concern because the use cycle of the computer between recharges is generally proportional to the total volume of the batteries for a given type of battery.

By placing the Computer Components within areas, of the keyboard which otherwise contain little of value, the computer designer can create a computer that is smaller in total volume and size than is otherwise possible. To more readily contain components interleaved within the keyboard, certain modifications may be made to the key caps, key structure, switch means, Keyboard Circuits, keyboard structure, or keyboard housing, or to any two or more of the above, so that components of a computer can be interleaved within the keyboard.

While there are a variety of methods of placing Computer Components between the keys of a keyboard using my invention, I will now describe what I view as the best and most likely commercial embodiments of the invention.

Because the design goal is to produce a computer as small as possible, both in volume and in physical dimensions, I will describe a keyboard which can be compacted. However, this invention also applies to keyboards that are not compacted.

Figure 2:
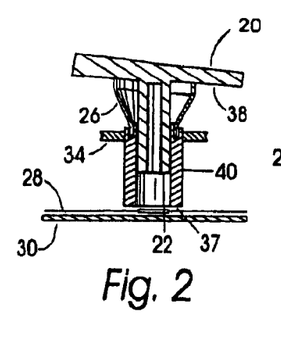
FIG. 2 shows the cross-section of a modified key.

FIG. 2 illustrates a modification of the key illustrated in FIG. 1. The key cap skirt has been eliminated, and the stem receiver and stem receiver reinforcement member of FIG. 1 has been modified by increasing the size and strength of the stem receiver, 40, (herein the "modified stem receiver") and removing the stem receiver reinforcement member.

Figure 3:
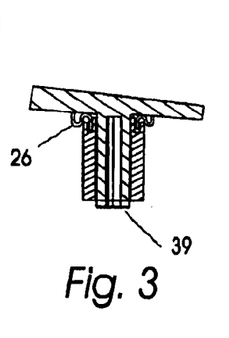
FIG. 3 shows the cross-section of a modified key with key in the depressed position.

FIG. 3 illustrates the key of FIG. 2 in a depressed position. The key has been depressed, and the annular elastomer, 26, has been deformed to accommodate the depression of the key. The bottom of the stem of the depressed key has moved below the bottom of the stem receiver, and accordingly said bottom of said stem becomes the Bottom of Key, 39. In other words, the Bottom of Key is the location which the bottom of the stem would occupy if said stem is fully depressed, and said Bottom of Key does not change when said stem is not depressed.

Figure 4:
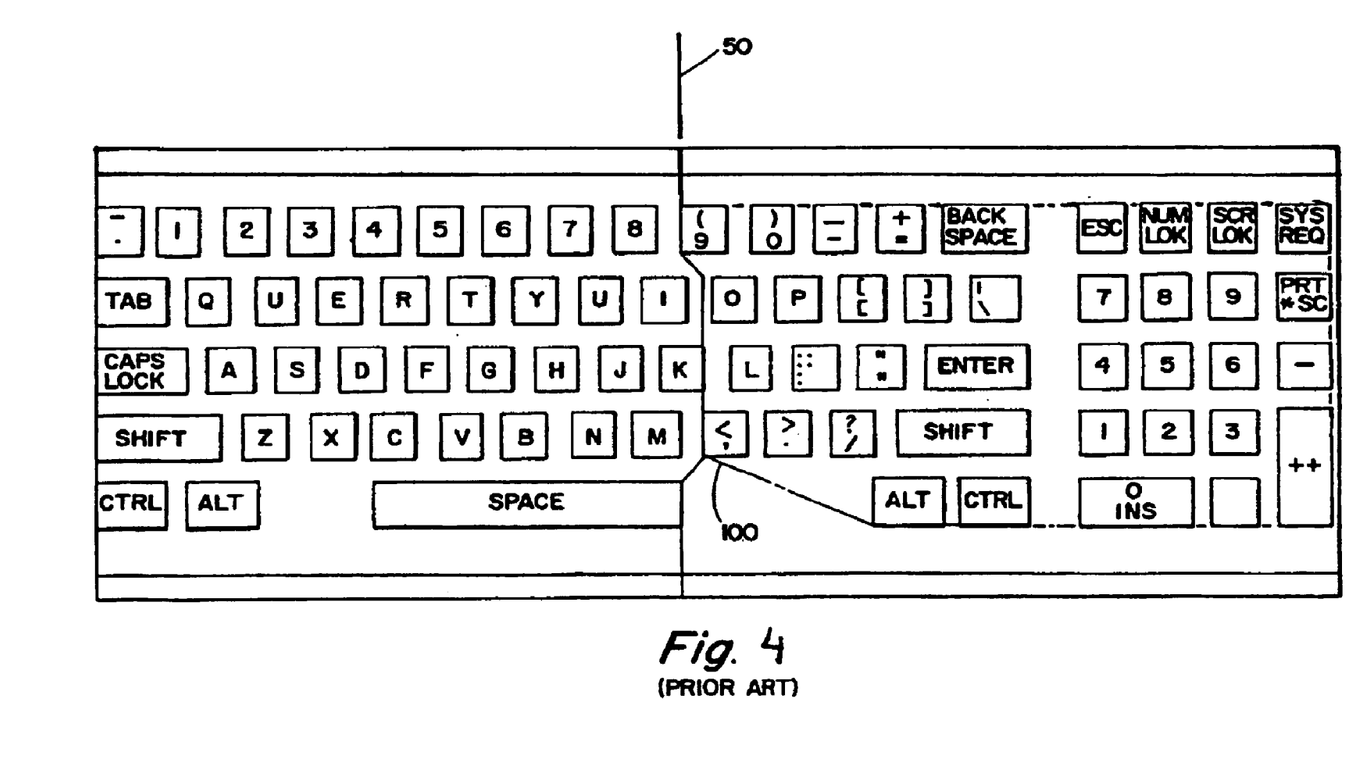
FIG. 4 shows the key cap pattern of a keyboard.

The keyboard described here would have two sections. FIG. 4 illustrates a keyboard in its operative position. No novelty is claimed for the illustrated key layout. The keyboard in FIG. 4 lacks "function keys" and other keys that may be present in some keyboards, but plainly the invention described here will also work on keyboards that contain function keys and other keys. The keyboard shown in FIG. 4 is approximately ⅔ of actual size. A dividing line, 50, shows where the two sections join in this embodiment.

A keyboard using the teachings of this disclosure could contain more than two sections or sections which are joined at locations other than that shown in FIG. 4. It is an object of this invention to describe a method of Interleaving Computer Components other than Keyboard Components between the keys of a keyboard that will work with a wide variety, number, and placement of keyboard sections, both those currently known and those which are developed in the future. The keyboard in FIG. 4 has 5 complete "rows" of keys. For purposes of this application, at least two adjacent keys along a row would constitute a "row" of keys, while all of the keys along a row would constitute a "complete row" of keys.

To avoid any misunderstanding, a "column" of keys would consist of two or more keys, each key associated with a different "row". Thus, the keys "ESC", "7", "4", "1", and "0" would constitute a "column" of keys in FIG. 4 (while the large "0" key would be a member of two different columns.)

Figure 5:
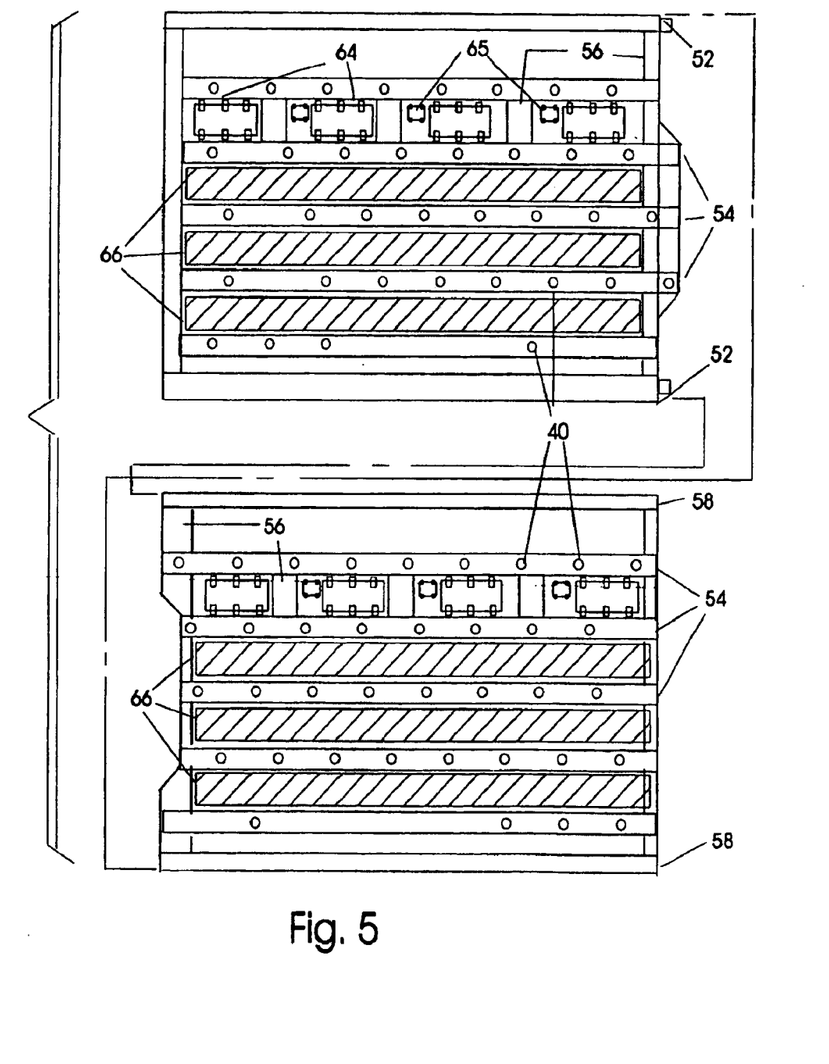
FIG. 5 shows two keyboard sections with the key caps removed.

In order to minimize the thickness of the keyboard and to provide space for the Computer Components, the frame in this embodiment is either raised relative to the bottom of the key and may be perforated, or said frame may be removed entirely from adjacent rows of keys. FIG. 5 illustrates the keyboard of FIG. 4 with the sections separated and the Key Caps removed. The left section of the keyboard of FIG. 4, is shown at the top of FIG. 5; the right section is shown at the bottom of FIG. 5. It is perfectly possible to build this keyboard where the frame consists essentially of longitudinal rods, 54, connecting the stem receivers of keys in a row. The frame between the rows can be either eliminated entirely or the frame between rows could consist of cross-members, 56. For purposes of this embodiment, the cross-members are placed only on the right and left edges of each section, and intermittently between the top and the next-to-top row of keys. Said cross-members provided said longitudinal rods greater stability and resistance to rotation about their long axis than would occur if said longitudinal rods are positioned solely by attachment to the backing plate, 30 in FIGS. 1 and 2, which rests underneath the components illustrated in FIG. 4 and thus is not shown in this view. Said cross-members are not included between the remaining rows in this preferred embodiment, except for the right and left edges, because the batteries contemplated in this embodiment and positioned between said rows will provide said rods sufficient resistance to rotation about their long axis.

There are other means of positioning cross-members, and it is an object of this invention to describe a method of Interleaving Computer Components other than Keyboard Components between the keys of a keyboard that will work with a wide variety of cross-members, both those currently known and those which are developed in the future.

Microchips, 64, and Passive Components, 65, are shown interleaved with the keyboard between rows 4 and 5, and batteries, 66, are shown interleaved with the keyboard between the remaining rows of said illustrated keyboard.

Figure 6:
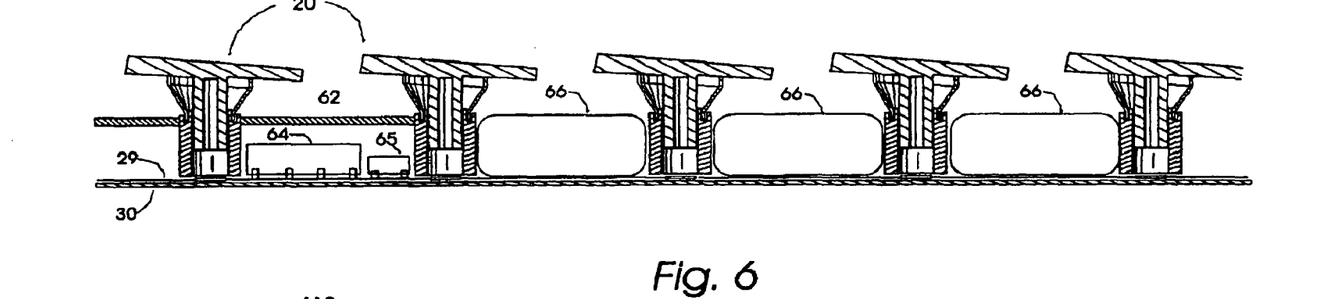
FIG. 6 shows a cross-section of a keyboard section with Computer Components and batteries interleaved within the keyboard.
Figure 8:
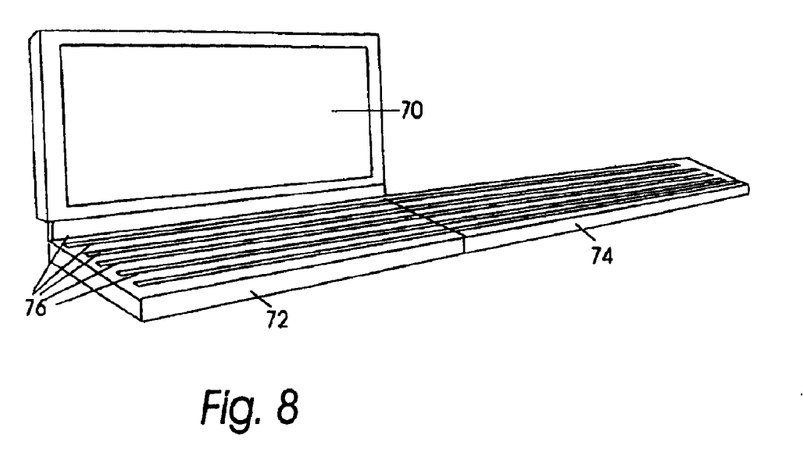
FIG. 8 shows a computer with a split keyboard in the expanded position.

FIG. 6 illustrates one section of the keyboard of FIG. 5 in cross-section. The Keyboard Circuit and the Computer Circuit have been combined into one circuit, 29. FIG. 8 illustrates one embodiment of a computer in the operative position using the teachings contained herein. The display, 70, provides a visual output of information to the user. Plainly, a folding or compacting display could be used, as could a "virtual" display, which the user would wear. The two keyboard sections, 72 and 74, contain the computer components interleaved with the keys of the keyboard. Five rows of keys are illustrated. 76.

Figure 9:
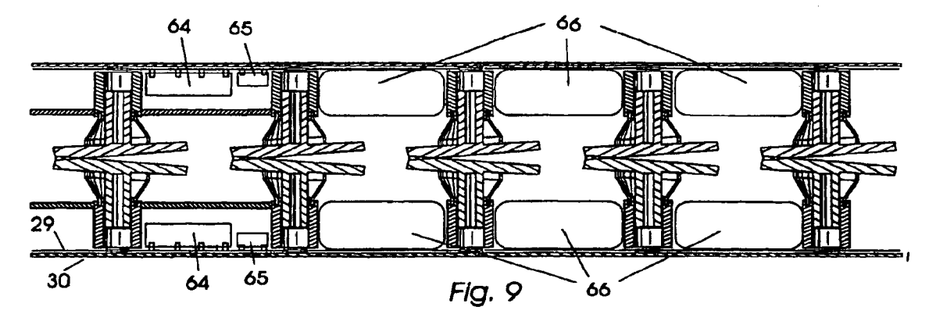
FIG. 9 shows a cross-section of a keyboard with the key sections folded.
Figure 11:
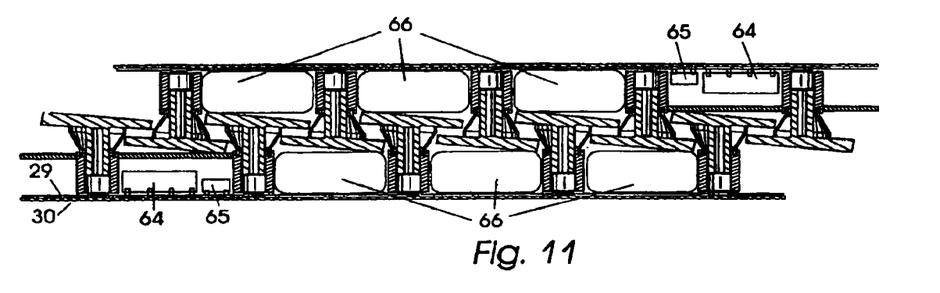
FIG. 11 shows a cross-section of a keyboard with the key sections interleaved.

A keyboard constructed using the teachings contained herein would be useful to produce a computer that is either more compact than other computers of similar capability, or possesses greater capability (e.g. larger battery capacity.) However, it may also be desirable to construct a computer that compacts for storage or transport. The keyboard can be compacted either by folding one or more sections onto themselves, as taught by Margolin, or by interleaving the keyboard sections, as taught by Roysden. The Cross-section of a keyboard which is compacting by folding is shown in FIG. 9. Compaction of the keyboard by interleaving the keyboard sections is shown in FIG. 11.

Figure 10:
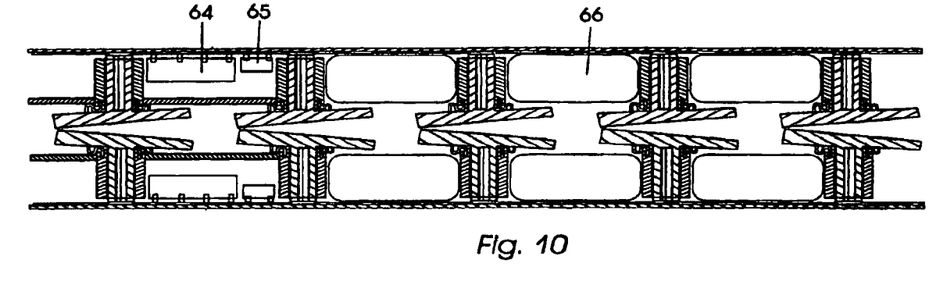
FIG. 10 shows a cross-section of a keyboard with the key sections folded and the keys retracted.

It may be desirable to retract the keys to reduce the vertical dimensions of the keyboard for storage or compaction. Several patents makes claims to a retracting key keyboard, e.g. Malhi, 5,971,637 (1999); Sellers, 5,590,020 (1996); Sellers 5,532,904 (1996). I make no claims here, either positive or negative, about retracting keys, but merely mention that a retracting key can be utilized in addition to the techniques taught here. Retracting the keys could be used on any of the keyboards, including both non-compacting keyboards and keyboards compacted by folding or interleaving the keyboard sections. FIG. 10 illustrates the cross-section of a keyboard compacted by folding with the keys retracted. The retraction method illustrated is merely the depression of all of the keys. However, the interleaving of computer components with the keyboard will work with other key retraction methods.

The description above is that of a fairly simply, largely planar keyboard. By planar, I mean that an Euclidean plane could be made to pass through all of the similar components of the keys of a keyboard. While such keyboards exist, some keyboards incorporate more elaborate designs. For instance, the angle of the Key Cap relative to the stem may change as we move up the rows, or the key itself may be oriented at different angles to the working surface (the desktop here), to achieve perceived ergonomic benefits. See FIG. 12. See also Roysden, U.S. Pat. No. 5,575,576, for a fuller description of the curved keyboard. The net result is that Euclidian planes cannot easily be used to describe certain surfaces.

Figure 12:
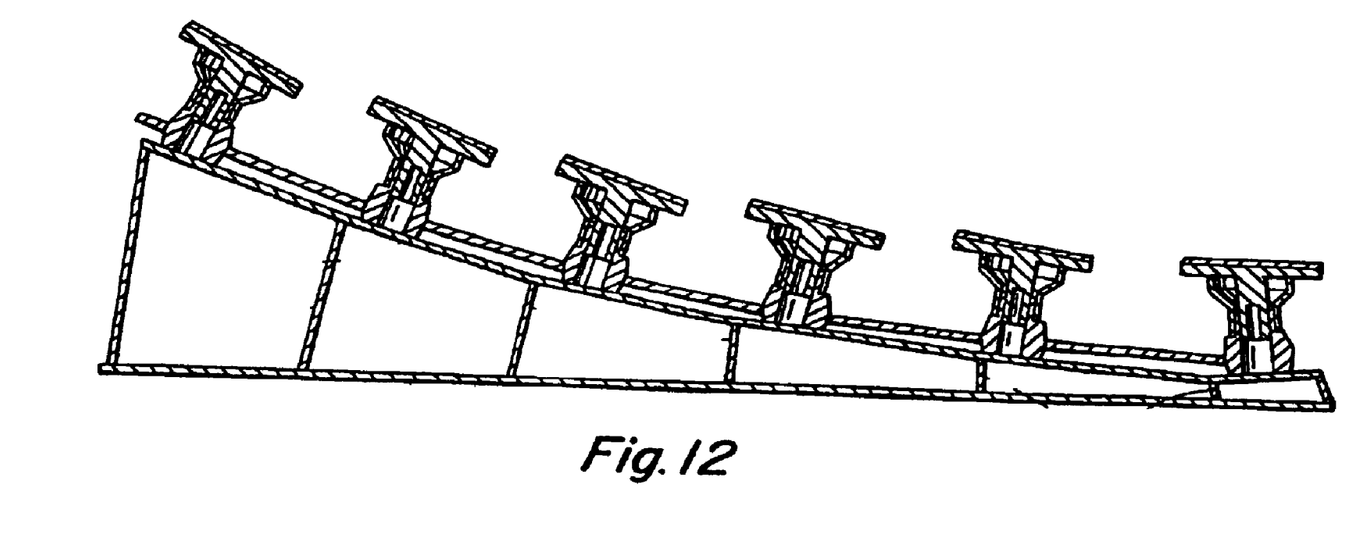
FIG. 12 shows a curved keyboard.

The keyboard of FIG. 12 could have the Computer Components other than Keyboard Components interleaved between the keys of said keyboard when said keyboard is in its operative position, or the keys could be moved from a storage position, in which the Computer Components other than Keyboard Components interleaved between the keys of said keyboard, to an operative position, in which said Computer Components are not interleaved between the keys of said keyboard when said keyboard is in said operative position.

These more elaborate designs creates the need of a more elaborate language than Euclidean geometry to describe positional relationships.

I need to name certain boundaries, surfaces, planes, and the like. The first is the "Key Cap Boundary", defined as the line of minimum length that will fully enclose the Key Caps of the keyboard. If the keyboard is separable into two or more sections, then each section shall be deemed to be a keyboard for purposes of this application.

As used in this application, the term "line" includes "line segments" of less than infinite length. I will further require that the Key Cap Boundary touch a portion of each Key Cap lying along the boundary, but it will not intersect any Key Cap of the keyboard. (When I say that a line, plane, or other construct will not "intersect" another object, I mean that it may touch, but will not pass through, said other object.) For reasons described herein, a Key Cap Boundary need not lie along an Euclidean plane. On FIG. 4, the broken line, 100 illustrates the "Key Cap Boundary" of the right-hand section.

Figure 7:
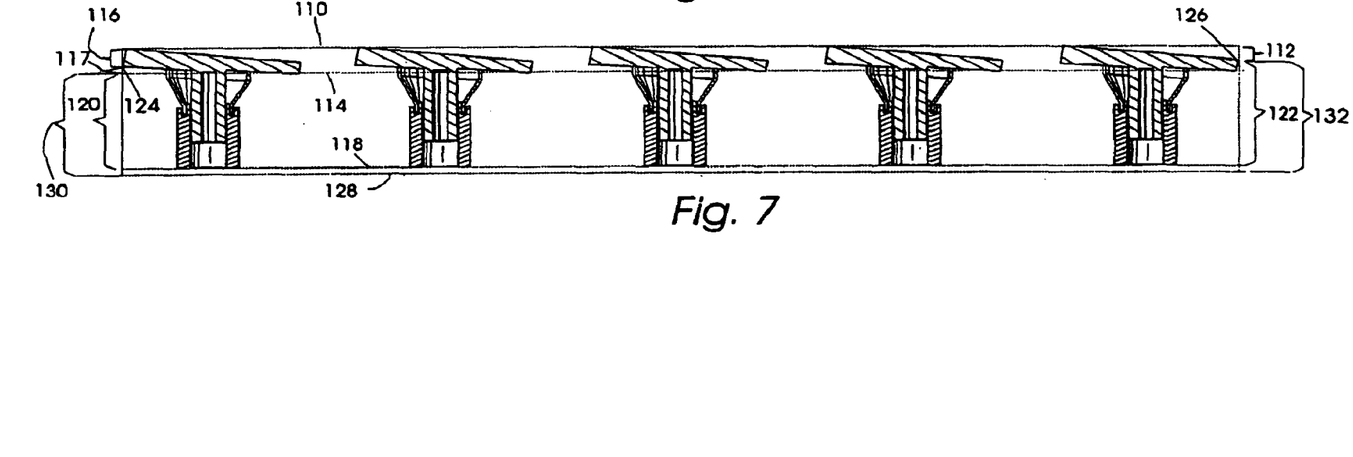
FIG. 7 shows a cross-section of a keyboard section, showing certain defined planes.

FIG. 7 shows a cross-section of a keyboard section, containing several rows of keys; only 1 key in each row is illustrated. Drawing an analogy from topology, if a rubber sheet is laid on top of the keyboard, such that a part of the rubber sheet touches at least one part of the top of each Key Cap of the section, but no part of the rubber sheet intersects any Key Cap, and bound that rubber sheet with a projection of the Key Cap Boundary such that the projection is perpendicular to the rubber sheet, and arrange that bound rubber sheet such that it maintains a minimum surface area, we will have defined the "Upper Key Cap Plane" for that keyboard. Broken line 110 illustrates one line along the Upper Key Cap Plane for the keyboard illustrated in FIG. 7; line 112 shows the projection of the Key Cap Boundary for the bottom row of keys. (For purposes of the foregoing and following discussion, I will assume that the Key Cap Boundary touches the upper row of keys at point 124, and the lower row of keys at point 126.)

The projection of the Key Cap Boundary onto the rubber sheet defines the boundary of the plane or "plane boundary".

For purposes of this discussion, our "rubber sheet" is an infinitely thin, flexible sheet-essentially a two-dimensional imaginary construct. Using topological terms from *Surface Topology*, P. A. Firby and C. F. Gardiner, Ellis Horwood Limited, Publishers, Halsted Press Paperback Edition, first published 1982, pp. 15-17, the Upper Key Cap Plane is a bounded set, since it can be placed inside a finite box, but it is not a 2-dimensional manifold, since it has a one-dimensional boundary.

Similarly, if we take our imaginary rubber sheet and arrange it such that it just touches at least one part of the bottom of each Key Cap, but no part of the rubber sheet intersects any Key Cap of the keyboard, and bound the rubber sheet by a projection of the Key Cap Boundary such that the projection is perpendicular to the rubber sheet, and arrange that bound rubber sheet such that it maintains a minimum surface area, we will have defined the "Lower Key Cap Plane". Broken line 114 illustrates one line along the Lower Key Cap Plane for the keyboard illustrated in FIG. 7; line 117 shows the projection of the Key Cap Boundary onto the Lower Key Cap Plane for the top row of keys. Note that there is a stem involved in our illustrated key, and that the imaginary rubber sheet of our definition can intersect (i.e. pass through) the stem. (I am defining spacial relationships, not structure ones, and the intersection of the stem by our imaginary rubber sheet does not physically sever the stem.)

Similarly, if we take a rubber sheet and arrange it such that it touches a portion of the Bottom of Undepressed Key for each key of a keyboard, bound the rubber sheet by a projection of the Key Cap Boundary such that the projection is perpendicular to the rubber sheet, and arrange that bound rubber sheet such that it maintains a minimum surface area, we will have defined the "Lower Undepressed Key Plane". Broken line 118 illustrates one line along the Lower Undepressed Key Plane for the keyboard illustrated in FIG. 7; lines 120 and 122 show the projection of the Key Cap Boundary for the upper and lower rows of keys onto the Lower Undepressed Key Plane.

Similarly, if we take a rubber sheet and arrange it such that it touches the Bottom of Key of each key of a keyboard, bound the rubber sheet by a projection of the Key Cap Boundary such that the projection is perpendicular to the rubber sheet, and arrange that bound rubber sheet such that it maintains a minimum surface area, we will have defined the "Lower Key Plane". Refer to FIG. 3 to locate the "Bottom of Key". Broken line 128 illustrates one line along the Lower Key Plane. Lines 130 and 132 show the projection of the Key Cap Boundary onto the Lower Key Plane.

A "pseudocylindrical surface" is defined as the closed figure of minimum surface area having as its two edges the boundary of two bound planes.

I call it a "pseudocylindrical surface" because it is like a cylindrical surface—the lateral surface of a cylinder— except that a cylindrical surface circumscribes a circle, while the figure circumscribed by my pseudocylindrical surface need not be a circle. The terms "cylinder" and "cylindrical surface" would need no extended discussion to those familiar with the art. See, e.g. Van No strand's Scientific Encyclopedia, published by D. Van No strand Company, Inc., (New York), 14th Edition (1968) at p. 482.

Several closed 3-dimensional figures, which I will call "spaces", can now be defined. The first space is defined by two bound planes, the Upper Key Cap Plane and the Lower Key Plane, with a lateral side consisting of the pseudocylindrical surface defined by the boundaries of said two planes, and is called the "Section Key Space".

The second space is defined by two bound planes, the Upper Key Cap Plane and the Lower Undepressed Key Plane, with a lateral side consisting of the pseudocylindrical surface defined by the boundaries of said two planes, and is called the "Section Undepressed Key Space".

The third space is defined by two bound planes, the Lower Key Cap Plane and the Lower Key Plane, with a lateral side consisting of the pseudocylindrical surface defined by the boundaries of said two planes, and is called the "Section Capless Key Space".

The fourth space is defined by two bound planes, the Lower Key Cap Plane and the Lower Undepressed Key Plane, with a lateral side consisting of the pseudocylindrical surface defined by the boundaries of said two planes, and is called the "Section Undepressed Key Capless Key Space".

Figure 13:
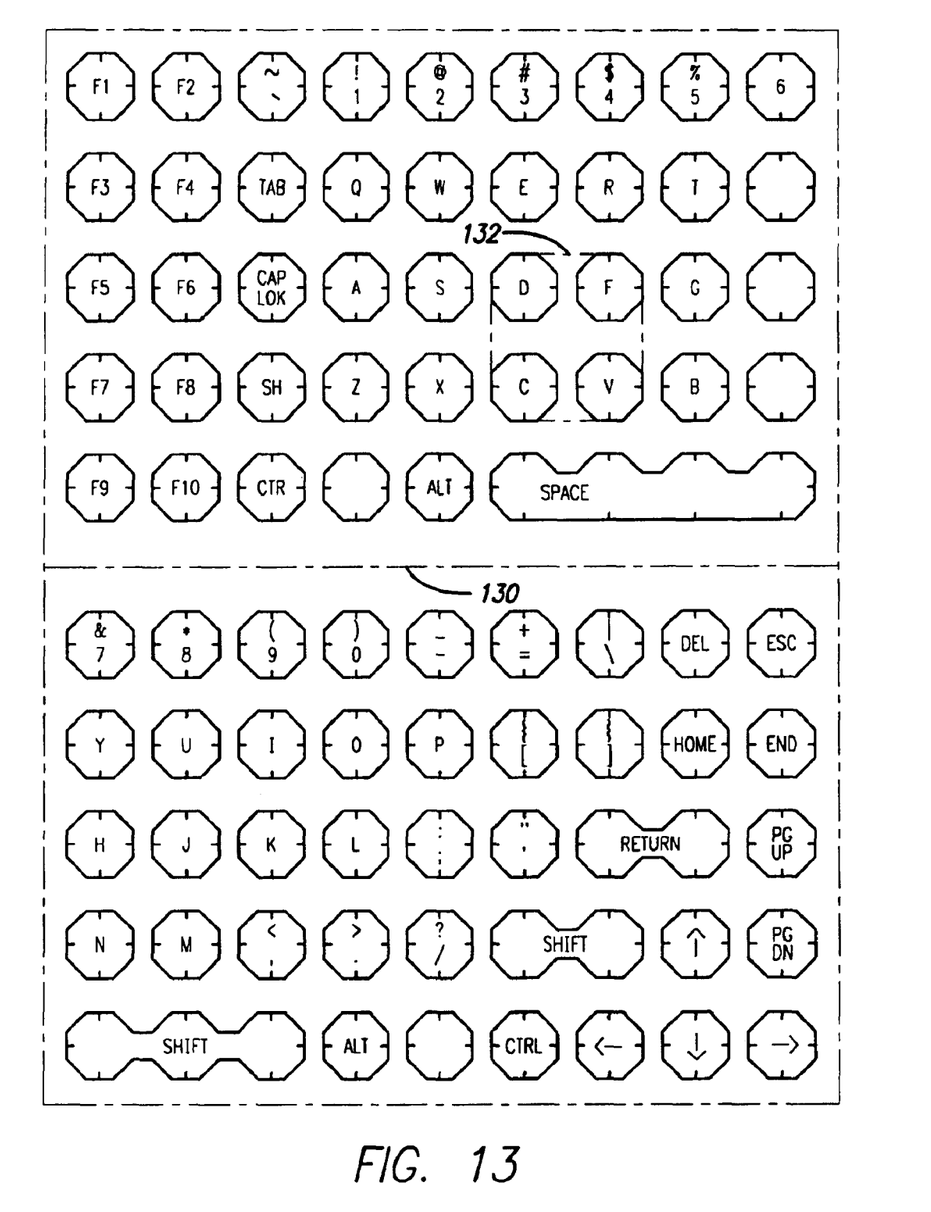
FIG. 13 shows a keyboard consisting of two keyboard sections and illustrates a Set Boundary Line and a Bounding Key Set.

For purposes of this application, a "Bounding Key Set" will consist of two contiguous rows of two keys each of a keyboard. There can be many Bounding Key Sets in any keyboard, and any one key can be a member of several Bounding Key Sets. Thus, for example, the "S" key cap in FIG. 13 is a member of four Bounding Key Sets: one set consists of the "A", "S", "Z", "X"keys; another set consists of the "S", "D", "X", and "C" set; another set consists of the "Q", "W", "A", and "S" keys; the fourth set consists of the "W", "E", "S", and "D" keys.

For each Bounding Key Set, we can define a "Bounding Key Set Upper Key Cap Plane". We will do so by first defining a "Set Boundary Line", consisting of the line of minimum length that will fully enclose the Key Caps of a Bounding Key Set, such Set Boundary Line touching but not intersecting each Key Cap in the Bounding Key Set. Line 132 of FIG. 13 illustrates the Set Boundary Line for the Bounding Key Set "D", "F", "C", "V". FIG. 13 illustrates a keyboard consisting of two keyboard sections, the two sections parted by broken line 130.

If we take our now familiar 2-dimensional rubber sheet and lay it on top of the Key Caps of the Bounding Key Set such that a part of the rubber sheet touches a portion of the top of each Key Cap of the Bounding Key Set, but no part of the rubber sheet intersects any Key Cap of the Bounding Key Set, and bound that rubber sheet with a projection of the Set Boundary Line of the set such that the projection is perpendicular to the rubber sheet, and arrange that bound rubber sheet such that it maintains a minimum surface area, we will have defined a "Bounding Key Set Upper Key Cap Plane".

If we take our now familiar 2-dimensional rubber sheet and lay it on bottom of the Key Caps of the Bounding Key Set such that a part of the rubber sheet touches a portion of the bottom of each Key Cap of the Bounding Key Set, but no part of the rubber sheet intersects any Key Cap of the Bounding Key Set, and bound that rubber sheet with a projection of the Set Boundary Line of the set such that the projection is perpendicular to the rubber sheet, and arrange that bound rubber sheet such that it maintains a minimum surface area, we will have defined a Bounding Key Set Lower Key Cap Plane Similarly, if we take a rubber sheet and arrange it such that it touches the Bottom of Key of each key of the Bounding Key Set, bound the rubber sheet by a projection of the Set Boundary Line of the set such that the projection is perpendicular to said rubber sheet, and arrange that bound rubber sheet such that it maintains a minimum surface area, we will have defined the "Bounding Key Set Lower Key Plane".

Similarly, if we take a rubber sheet and arrange it such that it touches Bottom of Undepressed Key for each key of the Bounding Key Set, bound the rubber sheet by a projection of the Set Boundary Line of the set such that the projection is perpendicular to said rubber sheet, and arrange that bound rubber sheet such that it maintains a minimum surface area, we will have defined the "Bounding Key Set Lower Undepressed Key Plane".

Four bounding key spaces can now be defined. The first space is defined by two bound planes, the Bounding Key Set Upper Key Cap Plane and the bounding key set Lower Key Plane, with a lateral side consisting of the pseudocylindrical surface defined by the boundaries of said two planes, and is called the "Bounding Key Set Space".

The first space is defined by two bound planes, the Bounding Key Set Upper Key Cap Plane and the bounding key set Lower Key Cap Plane, with a lateral side consisting of the pseudocylindrical surface defined by the boundaries of said two planes, and is called the "Bounding Key Set Undepressed Key Set".

The third space is defined by two bound planes, the bounding key set Lower Key Cap Plane and the Bounding Key Set Lower Key Plane, with a lateral side consisting of the pseudocylindrical surface defined by the boundaries of said two planes, and is called the "Bounding Key Set Capless Space".

The fourth space is defined by two bound planes, the bounding key set Lower Key Cap Plane and the Bounding Key Set Lower Undepressed Key Plane, with a lateral side consisting of the pseudocylindrical surface defined by the boundaries of said two planes, and is called the Bounding Key Set Undepressed Key Capless Space As was suggested previously, with this invention, it is possible to build a computer that could not be built before—a fully useable computer, with a keyboard upon which the adult human hand can comfortably and efficiently touch type, in a computer that could fit comfortably in a suit coat side pocket or a fairly small purse. Those familiar with the art would have no difficulty designing such a computer, after being advised of the keyboard disclosed herein.

What has been described is considered only illustrative of the principles of this invention. Therefore, those skilled in the art can devise various embodiments of the invention in accordance with those principles within the spirit and scope of the claims set out below.

Having described my invention in such terms as to enable those skilled in the art to understand and practice it, and having identified the presently preferred embodiments thereof, I claim:

1. A keyboard for a computer, the keyboard comprising:
    a plurality of keys, each key including a key structure;
    a keyboard structure holding the plurality of keys in place relative to one another and defining a space between the key structures of at least two of the plurality of keys; and
    a computer component other than a keyboard component, the computer component being at least partly disposed in the space between the key structures;
    wherein the computer component disposed between the key structures includes power means for providing power to the computer.

2. The keyboard of claim 1 wherein the power means comprises a power source.

3. The keyboard of claim 1 wherein the power means comprises power regulation means for regulating power supplied to the computer.

4. A keyboard for a computer, the keyboard comprising:
    a plurality of keys, each key including a key structure;
    a keyboard structure holding the plurality of keys in place relative to one another and defining a space between the key structures of at least two of the plurality of keys; and
    a computer component other than a keyboard component, the computer component being at least partly disposed in the space between the key structures;
    wherein the computer component disposed between the key structures comprises storage means for storing data.

5. A computer system comprising:
    a central processing unit;
    output means for outputting data from the computer, and
    a keyboard comprising:
        a plurality of keys, each key including a key structure;
        a keyboard structure holding the plurality of keys in place relative to one another and defining a space between the key structures of at least two of the plurality of keys; and
        a computer component other than a keyboard component, the computer component being at least partly disposed in the space between the key structures;
        wherein the computer component disposed between the key structures includes power means for providing power to the computer.

6. The computer system of claim 5 wherein the power means comprises a power source.

7. The computer system of claim 5 wherein the power means comprises power regulation means for regulating power supplied to the computer.

8. A computer comprising:
    a central processing unit;
    output means for outputting dta from the computer; and
    a keyboard comprising:
        a plurality of keys, each key including a key structure;
        a keyboard structure holding the plurality of keys in place relative to one another and defining a space between adjacent key structures of at least two of the plurality of keys; and
        a computer component other than a keyboard component, the computer component being at least partly disposed in the space between the adjacent key structures;
        wherein the computer component disposed between the key structures comprises an integrated circuit.

9. A computer system comprising:
    a central processing unit;
    output means for outputting data from the computer; and
    a keyboard comprising:
        a plurality of keys, each key including a key structure;
        a keyboard structure holding the plurality of keys in place relative to one another and defining a space between the key structures of at least two of the plurality of keys; and
        a computer component other than a keyboard component, the computer component being at least partly disposed in the space between the key structures;

wherein the computer component disposed between the key structures comprises storage means for storing data.

10. A keyboard for a computer, the keyboard comprising:
a plurality of keys, each key of the plurality of keys having a key structure supporting a key cap, the key structures and the key caps of the plurality of keys defining a section key space;
a keyboard structure for holding the plurality of keys in place relative to one another; and
a computer component other than a keyboard component, the computer component being at least partly disposed in the section key space;
wherein the computer component disposed in the section key space includes power means for providing power to the computer.

11. The keyboard of claim 10 wherein the power means comprises a power source.

12. The keyboard of claim 10 wherein the power means comprises power regulation means for regulating power supplied to the computer.

13. A keyboard for a computer, the keyboard comprising:
a plurality of keys, each key of the plurality of keys having a key structure supporting a key cap, the key structures and the key caps of the plurality of keys defining a section key space;
a keyboard structure for holding the plurality of keys in place relative to one another; and
a computer component other than a keyboard component, the computer component being at least partly disposed in the section key space when the keyboard is in an operative position for inputting information to the computer;
wherein the computer component disposed in the section key space comprises an integrated circuit.

14. A keyboard for a computer, the keyboard comprising:
a plurality of keys, each key of the plurality of keys having a key structure supporting a key cap, the key structures and the key caps of the plurality of keys defining a section key space;
a keyboard structure for holding the plurality of keys in place relative to one another; and
a computer component other than a keyboard component, the computer component being at least partly disposed in the section key space;
wherein the computer component disposed in the section key space comprises output means for outputting data from the computer and the output means comprising remote access means for transmitting data to or receiving data from a device that is not physically attached to the computer.

15. A keyboard for a computer, the keyboard comprising:
a plurality of keys, each key of the plurality of keys having a key structure supporting a key cap, the key structures and the key caps of the plurality of keys defining a section key space;
a keyboard structure for holding the plurality of keys in place relative to one another; and
a computer component other than a keyboard component, the computer component being at least partly disposed in the section key space;
wherein the computer component disposed in the section key space comprises storage means for storing data.

16. A keyboard for a computer, the keyboard comprising:
a plurality of keys, each key including a key structure and a key cap, the key structures and the key caps of the plurality of keys defining a section undepressed key capless key space;
a keyboard structure holding the plurality of keys in place relative to one another; and
a computer component other than a keyboard component, the computer component being at least partly disposed in the section undepressed key capless key space and being mounted to a surface facing the plurality of keys.

17. The keyboard of claim 16 wherein the computer component disposed in the section undepressed key capless key space includes power means for providing power to the computer.

18. The keyboard of claim 17 wherein the power means comprises a power source.

19. The keyboard of claim 17 wherein the power means comprises power regulation means for regulating power supplied to the computer.

20. The keyboard of claim 16 wherein the computer component disposed in the section undepressed key capless key space comprises an integrated circuit.

21. The keyboard of claim 20 wherein the output means comprises remote access means for transmitting data to or receiving data from a device that is not physically attached to the computer.

22. The keyboard of claim 16 wherein the computer component disposed in the section undepressed key capless key space comprises a passive component.

23. The keyboard of claim 16 wherein the computer component disposed in the section undepressed key capless key space comprises output means for outputting data from the computer.

24. The keyboard of claim 23 wherein the output means comprises remote access means for transmitting data to or receiving data from a device that is not physically attached to the computer.

25. The keyboard of claim 16 wherein the computer component disposed in the section undepressed key capless key space comprises storage means for storing data.

26. The keyboard of claim 16, wherein:
the key structures and the key caps of the plurality of keys also define a section undepressed key space; and
the computer component other than a keyboard component is at least partly disposed in the section undepressed key space.

27. The keyboard of claim 16 wherein the computer component disposed in the section undepressed key space includes power means for providing power to the computer.

28. The keyboard of claim 16 wherein the computer component disposed in the section undepressed key space comprises an integrated circuit.

29. The keyboard of claim 16 wherein the computer component disposed in the section undepressed key space comprises a passive component.

30. The keyboard of claim 16 wherein the computer component disposed in the section undepressed key space comprises output means for outputting data from the computer.

31. The keyboard of claim 16 wherein the computer component disposed in the section undepressed key space comprises storage means for storing data.

32. A keyboard for a computer, the keyboard comprising:
a plurality of keys, each key including a key structure and a key cap;
a keyboard structure holding the plurality of keys in place relative to one another;

the key structures and the key caps of the plurality of keys defining a bounding key set undepressed key capless space;

a printed circuit board having an inner surface facing the plurality of keys and an opposing outer surface; and a computer component other than a keyboard component, the computer being at least partly disposed in the bounding key set undepressed key capless space and being mounted to the inner surface of the printed circuit board.

33. The keyboard of claim 32 wherein the computer component disposed in the bounding key set undepressed key capless space includes power means for providing power to the computer.

34. The keyboard of claim 33 wherein the power means comprising a power source.

35. The keyboard of claim 33 wherein the power means comprises power regulation means for regulating power supplied to the computer.

36. The keyboard of claim 32 wherein the computer component disposed in the bounding key set undepressed key capless space comprises an integrated circuit.

37. The keyboard of claim 32 wherein the computer component disposed in the bounding key set undepressed key capless comprises a passive component.

38. The keyboard of claim 32 wherein the computer component disposed in the bounding key set undepressed key capless space comprises output means for outputting data from the computer.

39. The keyboard of claim 38 wherein the output means comprises remote access means for transmitting data to or receiving data from a device that is not physically attached to the computer.

40. The keyboard of claim 32 wherein the computer component disposed in the bounding key set undepressed key capless space comprises storage means for storing data.

41. The keyboard of claim 32, wherein:

the key structures and the key caps of the plurality of keys also define a bounding key set undepressed key set space; and the computer component other than a keyboard component is at least partly disposed in the bounding key set undepressed key set space.

42. The keyboard of claim 41 wherein the computer component disposed in the bounding key set undepressed key set space includes power means for providing power to the computer.

43. The keyboard of claim 41 wherein the computer component disposed in the bounding key set undepressed key set space comprises an integrated circuit.

44. The keyboard of claim 41 wherein the computer component disposed in the bounding key set undepressed key set space comprises a passive component.

45. The keyboard of claim 41 wherein the computer component disposed in the bounding key set undepressed key set space comprises output means for outputting data from the computer.

46. The keyboard of claim 45 wherein the output means comprises remote access means for transmitting data to or receiving data from a device that is not physically attached to the computer.

47. The keyboard of claim 41 wherein the computer component disposed in the bounding key set undepressed key set space comprises storage means for storing data.

* * * * *